United States Patent
Weiss et al.

(10) Patent No.: US 6,930,155 B2
(45) Date of Patent: Aug. 16, 2005

(54) POWDER COATINGS BASED ON THERMOSET-MODIFIED POLYMERS AND POLYESTERS

(75) Inventors: Jörn Volker Weiss, Haltern (DE); Werner Grenda, Herne (DE)

(73) Assignee: Degussa AG, Duesseldorf (DE)

(*) Notice: Subject to any disclaimer, the term of this patent is extended or adjusted under 35 U.S.C. 154(b) by 230 days.

(21) Appl. No.: 10/306,221

(22) Filed: Nov. 29, 2002

(65) Prior Publication Data

US 2003/0212205 A1 Nov. 13, 2003

(30) Foreign Application Priority Data

May 10, 2002 (DE) .......................................... 102 21 048

(51) Int. Cl.[7] .............................................. C08L 75/04
(52) U.S. Cl. ...................... 525/424; 525/418; 525/425; 525/437; 525/439; 525/440; 525/443; 525/444; 525/452; 525/453; 525/454; 525/457; 525/458; 525/459; 524/589; 524/590; 524/599; 524/601; 524/602; 524/606
(58) Field of Search ................................ 524/589, 590, 524/599, 601, 602, 606; 525/418, 424, 425, 437, 439, 440, 443, 444, 452, 453, 454, 457, 458, 459

(56) References Cited

U.S. PATENT DOCUMENTS

| | | | | |
|---|---|---|---|---|
| 4,847,321 A | * | 7/1989 | Hess et al. ................... | 524/788 |
| 4,859,760 A | | 8/1989 | Light, Jr. et al. | |
| 4,880,872 A | * | 11/1989 | Thomas ........................ | 525/43 |
| 4,920,173 A | * | 4/1990 | Gras ............................ | 524/590 |
| 5,059,634 A | * | 10/1991 | Smith .......................... | 521/167 |
| 5,342,884 A | * | 8/1994 | Tabor et al. .................. | 525/64 |
| 5,405,920 A | * | 4/1995 | Barbee et al. ............... | 525/440 |
| 5,422,414 A | * | 6/1995 | Smith .......................... | 528/60 |
| 5,859,164 A | | 1/1999 | Gras et al. | |
| 6,025,433 A | * | 2/2000 | Shibatoh et al. ............. | 524/590 |
| 6,420,493 B1 | * | 7/2002 | Ryckis-Kite et al. ........ | 525/440 |
| 6,710,136 B2 | * | 3/2004 | Grenda et al. ............... | 525/440 |
| 2002/0045717 A1 | | 4/2002 | Grenda et al. | |
| 2004/0024114 A1 | * | 2/2004 | Wenning et al. ............. | 524/589 |

OTHER PUBLICATIONS

U.S. Appl. No. 09/939,686, filed Aug. 28, 2001, Grenda et al.
U.S. Appl. No. 09/939,831, filed Aug. 28, 2001, Grenda et al.
U.S. Appl. No. 10/306,215, filed Nov. 29, 2002, Weiss et al.
U.S. Appl. No. 10/306,220, filed Nov. 29, 2002, Weiss et al.
U.S. Appl. No. 10/306,222, filed Nov. 29, 2002, Weiss et al.
U.S. Appl. No. 10/306,221, filed Nov. 29, 2002, Weiss et al.

* cited by examiner

Primary Examiner—Jeffrey B. Robertson
(74) Attorney, Agent, or Firm—Oblon, Spivak, McClelland, Maier & Neustadt, P.C.

(57) ABSTRACT

A polyurethane composition comprising:

A) from 3 to 35% by weight of a polymeric composition comprising
  1) at least one polymer and
  2) at least one thermoset in amounts of from 0.5 to 50% by weight, based on the sum of A1) and A2), prepared by reaction in the polymer matrix A1) of
    a) at least one starting component containing $NH_2$ groups and
    b) at least one starting component containing NCO groups, a) and b) having simultaneously or independently a functionality of $\geq 2$ and at least one starting component having a functionality of >2 being present in amounts of from 0.5 to 100% by weight, based on the weight of A2);

B) from 15 to 45% by weight in the polymeric composition A), based thereon, of at least one amorphous and/or crystalline polyester having an OH number of from 10 to 250 mg KOH/g;

C) from 7 to 25% by weight in the polymeric composition A), based thereon, of at least one curing agent based on blocked polyisocyanates, isocyanurates and/or uretdiones having a functionality of at least 1.7;

D) from 1 to 50% by weight in the polymeric composition A), based thereon, of auxiliaries and additives; there being from 0.6 to 1.2 NCO groups per OH group of A) and B).

44 Claims, No Drawings

POWDER COATINGS BASED ON THERMOSET-MODIFIED POLYMERS AND POLYESTERS

BACKGROUND OF THE INVENTION

Field of the Invention

The invention describes novel powder coatings based on polyesters, thermoset-modified polymers, and crosslinkers.

Coatings systems which give a substrate an even, matte surface are possessed of considerable interest. The reason for this is predominantly practical in nature. Glossy surfaces require a far greater degree of cleaning than matte surfaces. Furthermore, it may be desirable on safety grounds to avoid strongly reflecting surfaces.

The simplest method of obtaining a matte surface is to admix smaller or larger amounts of fillers, such as chalk, finely divided silica or barium sulfate, for example, to the powder coatings in accordance with the extent of the desired matte effect. However, such additions result in a deterioration in the film properties of the coating, such as adhesion, flexibility, impact strength, and chemical resistance.

The addition of substances incompatible with the coating material, such as waxes or cellulose derivatives, for example, clearly gives rise to a matte surface, but slight changes in the course of extrusion lead to fluctuations in the surface gloss. The reproducibility of the matte effect is not ensured.

Polyisocyanates containing urea and uretdione groups have become known recently. DE-A 195 46 750 claims reaction products of isophorone diisocyanate uretdione and disecondary diamines as curing agents for producing polyurethane (PU) coatings with glossy surfaces.

DE-A 196 30 844 was the first to describe matte PU powder coatings comprising as a curing component isophorone diisocyanate uretdiones containing urea groups. They are prepared by reacting uretdiones with water. Intermediates which form during this reaction, with the elimination of carbon dioxide, are primary amines, which react with remaining isocyanate groups to form ureas. The nitrogen atoms of the urea groups are in each case monosubstituted. Reactions of polyisocyanates with water are difficult to reproduce, because of the formation of byproducts.

DE-A 196 37 375 describes PU powder coatings which are formulated for a matte effect by means of isophorone diisocyanate uretdiones containing urea groups as curing agents. These curing agents are formed by the reaction of isophorone diisocyanate uretdione with disecondary diamines. The disecondary diamines are reaction products of diprimary diamines and maleic or fumaric esters.

DE-A 196 37 377 and DE-A 198 16 547 claim polyaddition products containing uretdione groups and urea groups as a curing component for forming matte polyurethane coatings. These curing agents are prepared by reacting isophorone diisocyanate uretdione with diamines containing one primary and secondary amino groups. Preparation of the pure diamines is in some cases complex and extremely costly.

DE-A 100 42 318 then describes matte polyurethane coatings composed of certain hydroxyl-containing polyesters, standard commercial polyisocyanate crosslinkers, and special, separately prepared polyurea matting agents, the ingredients being physically mixed to give the powder coating material.

EM 010226a (internal file reference) describes polymers, especially hydroxyl-containing polyesters and acrylates, in which thermosets are prepared by introducing their corresponding starting materials, followed by reaction. The preparation of certain polyureas in said polymers is described as being particularly suitable.

A problem was to find novel polyurethane powder coatings for matte coatings.

The invention provides polyurethane powder coatings comprising
A) from 3 to 35% by weight of a polymeric composition comprising
  1) at least one polymer and
  2) at least one thermoset in amounts of from 0.5 to 50% by weight, based on the weight of A1) and A2), prepared by reaction in the polymer matrix A1) of
    a) at least one starting component containing $NH_2$ groups and
    b) at least one starting component containing NCO groups, a) and b) having simultaneously or independently a functionality of $\geq 2$ and at least one starting component having a functionality of $>2$ being present in amounts of from 0.5 to 100% by weight, based on the weight of A2);
B) from 15 to 45% by weight in the polymeric composition A), based thereon, of at least one amorphous and/or crystalline polyester having an OH number of from 10 to 250 mg KOH/g;
C) from 7 to 25% by weight in the polymeric composition A), based thereon, of at least one curing agent based on blocked polyisocyanates, isocyanurates and/or uretdiones having a functionality of at least 1.7;
D) from 1 to 50% by weight in the polymeric composition A), based thereon, of auxiliaries and additives; there being from 0.6 to 1.2 NCO groups per OH group of A) and B).

The invention preferentially provides polyurethane powder coatings comprising
A) from 3 to 35% by weight of a polymeric composition comprising
  1) at least one OH-containing polymer having an OH functionality of $\geq 2$, preferably a polyester and/or polyacrylate, and
  2) at least one thermoset in amounts of from 0.5 to 50% by weight, based on the weight of A1) and A2), prepared by reaction in the polymer matrix A1) of
    a) at least one starting component containing $NH_2$ groups and
    b) at least one starting component containing NCO groups, a) and b) having simultaneously or independently a functionality of $>2$ and at least one starting component having a functionality of $>2$ being present in amounts of from 0.5 to 100% by weight, based on the weight of A2);
B) from 15 to 45% by weight in the polymeric composition A), based thereon, of at least one amorphous and/or crystalline polyester having an OH number of from 10 to 250 mg KOH/g;
C) from 7 to 25% by weight in the polymeric composition A), based thereon, of at least one curing agent based on blocked polyisocyanates, isocyanurates and/or uretdiones having a functionality of at least 1.7;
D) from 1 to 50% by weight in the polymeric composition A), based thereon, of auxiliaries and additives; there being from 0.6 to 1.2 NCO groups per OH group of A) and B).

Suitable polymers A1) include in principle all known polymers such as, for example, polyolefins, polybutadienes, polystyrenes, polysiloxanes, and polyamides, provided they possess a melting point of not more than 220° C. Copolymers and block polymers are also suitable as polymer A1), such as styrene-diene polymers, for example.

Suitable polymers having a functionality $\geq 2$ include in general all polymers which possess a functionality $\geq 2$, but especially hydroxyl-containing polyesters and polyacrylates.

The hydroxyl-containing polyesters preferably employed are prepared by polycondensation of suitable dicarboxylic and/or polycarboxylic acids, esters and/or anhydrides with diols and/or polyols. Condensation takes place in a conventional manner in an inert gas atmosphere at temperatures from 100 to 260° C., preferably from 130 to 220° C., in the melt or azeotropically, as described, for example, in Methoden der Organischen Chemie (Houben-Weyl); Volume 14/2, pages 1 to 5, 21 to 23, 40 to 44, Georg Thieme Verlag, Stuttgart 1963, or in C. R. Martens, Alkyd Resins, pages 51 to 59, Reinhold Plastics Appl. Series, Reinhold Publishing Comp., New York, 1961. The carboxylic acids preferred for preparing polyesters may be aliphatic, cycloaliphatic, aromatic and/or heterocyclic in nature and may be unsaturated and/or substituted by halogen atoms. Examples thereof include the following: succinic, adipic, suberic, azelaic, sebacic, phthalic, terephthalic, isophthalic, trimellitic, pyromellitic, tetrahydrophthalic, hexahydrophthalic, hexahydroterephthalic, dichlorophthalic and tetrachlorophthalic, endomethylenetetrahydrophthalic, glutaric, and 1,4-cyclohexanedicarboxylic acids, and, where obtainable, their anhydrides or esters. Particularly suitable are isophthalic acid, terephthalic acid, hexahydroterephthalic acid, and 1,4-cyclohexanedicarboxylic acid.

Examples of suitable polyols include monoethylene glycol, 1,2- and 1,3-propylene glycol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, 3(4),8(9)-bis(hydroxymethyl)tricyclo[5.2.1.0$^{2,6}$]decane (Dicidol), 1,4-bis(hydroxymethyl)-cyclohexane, 2,2-bis(4-hydroxycyclohexyl)-propane, 2,2-bis[4-(β-hydroxyethoxy)phenyl]-propane, 2-methylpropane-1,3-diol, 2-methylpentane-1,5-diol, 2,2,4(2,4,4)-trimethylhexane-1,6-diol, glycerol, trimethylolpropane, trimethylolethane, hexane-1,2,6-triol, butane-1,2,4-triol, tris(β-hydroxyethyl)isocyanurate, pentaerythritol, mannitol, and sorbitol, and also diethylene glycol, triethylene glycol, tetraethylene glycol, dipropylene glycol, polypropylene glycols, polybutylene glycols, xylylene glycol, and neopentyl glycol hydroxypivalate. Preferred polyols are monoethylene glycol, neopentyl glycol, Dicidol, cyclohexanedimethanol, trimethylolpropane, and glycerol.

Amorphous polyesters thus prepared preferably have an OH number of from 15–200 mg KOH/g, a Tg of 25–85° C., a melting range of from 60 to 110° C., and an acid number of <10 mg KOH/g. The molar masses are preferably from 2000 to 7000.

Crystalline polyesters prepared accordingly have an OH number of from 15 to 130 mg KOH/g, a Tg of from –50 to 40° C., a melting range of from 60 to 130° C., and an acid number of <8 mg KOH/g. The molar masses are preferably from 1800 to 6500.

The hydroxyl-containing polyacrylates preferably employed have an OH number of from 20 to 150 mg KOH/g, a molar mass of from 1800 to 6000, and a Tg of from 30 to 90° C. and are prepared by polyaddition of suitable ethylenically unsaturated monomers. Examples of such monomers are styrene, α-methylstyrene, $C_2$–$C_{40}$ alkyl esters of acrylic acid or $C_1$ to $C_{40}$ alkyl esters of methacrylic acid, such as methyl methacrylate, ethyl acrylate, propyl methacrylate, isopropyl acrylate, n-butyl methacrylate, isobutyl acrylate, tert-butyl methacrylate, pentyl methacrylate, n-hexyl methacrylate, n-heptyl methacrylate, n-octyl acrylate, 2-ethylhexyl acrylate, decyl methacrylate, lauryl methacrylate, palmityl methacrylate, phenoxyethyl methacrylate, phenyl methacrylate, cyclohexyl methacrylate, tert-butylcyclohexyl acrylate, butylcyclohexyl methacrylate, and trimethylcyclohexyl methacrylate. Hydroxyalkyl esters of α,β-unsaturated carboxylic acids such as of acrylic acid and/or methacrylic acid, having a primary OH group and a $C_5$–$C_{18}$ hydroxyalkyl radical, likewise belong to this group, such as, for example, hydroxyhexyl acrylate, hydroxyoctyl acrylate, and the corresponding methacrylates, and reaction products of hydroxyethyl (meth)acrylate with caprolactone, and also monomers containing secondary OH functions, such as adducts of glycidyl (meth)acrylate and saturated short-chain acids having $C_1$–$C_3$ alkyl radicals, such as acetic acid or propionic acid, for example.

In accordance with the invention, the thermoset A2) is prepared from its starting components in the polymer matrix A1). The starting components A2a) and A2b) have a functionality of at least 2.0, with the proviso that there is always one starting component having a functionality of more than two present in amounts of from 0.5 to 100% by weight, based on the weight of A2), in component A2). In principle it is irrelevant whether the amino component or the isocyanate component has the functionality of more than two; preferably, however, the isocyanate component is used. The approximate molar masses of the thermosets vary from 2000 to 70 000, and are more preferably greater than 4000.

In general, the thermosets A2) are present in amounts of from 0.5 to 50% by weight, preferably from 2 to 30% by weight, in the polymeric composition A), based thereon.

In order to prepare the thermosets it is possible to use, as component A2b), aliphatic, cycloaliphatic, araliphatic, and aromatic isocyanates and their isocyanurates in pure form or as any desired mixtures with one another. Examples that may be listed include the following: cyclohexane diisocyanates, methylcyclohexane diisocyanates, ethylcyclohexane diisocyanates, propylcyclohexane diisocyanates, methyldiethylcyclohexane diisocyanates, phenylene diisocyanates, tolylene diisocyanates, bis(isocyanatophenyl)methane, propane diisocyanates, butane diisocyanates, pentane diisocyanates, hexane diisocyanates such as hexamethylene diisocyanate (HDI) or 1,5-diisocyanato-2-methylpentane (MPDI), heptane diisocyanates, octane diisocyanates, nonane diisocyanates such as 1,6-diisocyanato-2,2,4-trimethylhexane or 1,6-diisocyanato-2,2,4-trimethylhexane (TMDI), nonane triisocyanates (e.g., 4-isocyanatomethyl-1,8-octane diisocyanate (TIN)), decane diisocyanates and triisocyanates, undecane diisocyanates and triisocyanates, dodecane diisocyanates and triisocyanates, isophorone diisocyanate (IPDI), bis(isocyanatomethylcyclohexyl)methane ($H_{12}$MDI), isocyanatomethyl methylcyclohexyl isocyanates, 2,5(2,6)-bis(isocyanato-methyl)bicyclo[2.2.1]heptane (NBDI), 1,3-bis(isocyanatomethyl)cyclohexane (1,3-$H_6$-XDI), and 1,4-bis(isocyanatomethyl)cyclohexane (1,4-$H_6$-XDI). This list is understood to include all regioisomers and stereoisomers of the isocyanates exemplified. Preference is given to using HDI, IPDI, MPDI, TMDI, 1,3- and 1,4-$H_6$-XDI, NBDI, and mixtures of HDI and IPDI. Preferred polyureas in the context of the invention are those composed of IPDI, IPDI isocyanurate, HDI or HDI isocyanurate, and any desired mixtures thereof.

In the invention it is possible to use as component A2a) all aliphatic, (cyclo)aliphatic, cycloaliphatic, and aromatic diamines and/or polyamines ($C_5$–$C_{18}$).

Suitable diamines include 1,2-ethylenediamine, 1,2-propylenediamine, 1,3-pro-pylenediamine, 1,2-butylenediamine, 1,3-butylenediamine, 1,4-butylenediamine, 2-(ethylamino)ethylamine, 3-(methylamino)propylamine, 3-(cyclohexylamino) propylamine, 4,4'-diaminodicyclohexylmethane, isophoronediamine, 4,7-dioxadecane-1,10-diamine, N-(2-aminoethyl)-1,2-ethanediamine, N-(3-aminopropyl)-1,3-propanediamine, N,N"-1,2-ethanediylbis(1,3-propanediamine), and also hexamethylenediamines, which may also be substituted by one or more $C_1$–$C_4$ alkyl radicals. Mixtures of said diamines can also be used. Preference is given to using isophoronediamine.

Polyamines containing more than 2 NH groups are also suitable, such as 4-aminomethyl-1,8-octanediamine, diethylenetriamine, dipropylenetriamine, and tetraethylenepentamine, for example.

Generally, thermosets having an $NCO/NH_2$ ratio of from 0.8 to 1.2:1 are prepared. When using equimolar amounts with an $NCO/NH_2$ ratio of 1:1, infinitely crosslinked, solid, and brittle thermosets are obtained in the polymers.

Preferred thermosets in the context of the invention are those composed of IPD and IPDI and/or IPDI isocyanurate and/or HDI and/or HDI isocyanurate. These have molar masses of more than 4000 and contain at least 8% by weight, preferably 20% by weight, with particular preference from 40 to 100% by weight, of isocyanurates and/or amines having a functionality >2, preferably isocyanurates, preferentially IPDI isocyanurate and/or HDI isocyanurate. Polyureas formed from pure isocyanurates and IPD are also preferred. They are prepared without solvent, in solution or, for example, in extruders.

In one preferred embodiment of the invention there are from 3 to 20% by weight, with particular preference 4, 5, 6, 7, 8, 9, 10, 11, 12, 13, 14, 15, 16, 17, 18 or 19% by weight, of thermoset in the polymeric composition A), based thereon, particularly in the OH-containing polyester and acrylate.

For the polyester B) it is essential to the invention that it comprises amorphous or (semi)crystalline, hydroxyl-containing polyesters or mixtures of both. All known polyesters of this kind having an OH number of from 10 to 250 mg KOH/g are suitable in the context of the invention.

The (semi)crystalline polyesters generally have a hydroxyl number of 15–150 mg KOH/g; the melting points are between 60 and 130° C. and the glass transition temperature between –50 and 40° C., and the average molecular weight is between 1800 and 6500. The polyesters are based on linear dicarboxylic acids and aliphatic and cycloaliphatic, linear or branched polyols. Dicarboxylic acids used preferably are succinic acid, adipic acid, sebacic acid and/or dodecanedioic acid. In this invention the expression "dicarboxylic acid" includes its esters, anhydrides or acid chlorides. It is also possible to use other aliphatic, cycloaliphatic or aromatic dicarboxylic acids. Examples of such dicarboxylic acids are glutaric acid, azelaic acid, 1,4-, 1,3-, and 1,2-cyclohexanedicarboxylic acid, terephthalic acid, and isophtalic acid. As the polyol component for the (semi) crystalline polyesters it is preferred to use monoethylene glycol, butane-1,4-diol or hexane-1,6-diol. It is possible to use other aliphatic or cycloaliphatic, linear or branched polyols as well. Examples of polyols, of this kind are diethylene glycol, neopentyl glycol hydroxypivalate, neopentyl glycol, cyclohexanedimethanol, pentane-1,5-diol, pentane-1,2-diol, nonane-1,9-diol, trimethylolpropane, glycerol, and pentaerythritol.

The amorphous polyesters possess a hydroxyl number of from 15 to 200 mg KOH/g, a glass transition temperature of from 35 to 85° C., and an average molecular weight of from 2000 to 7000; the melting range lies between 60 and 110° C. The amorphous polyesters are based on linear or branched polycarboxylic acids and aliphatic or cycloaliphatic, linear or branched polyols. Isophthalic acid is a preferred dicarboxylic acid used. It is also possible to use other aliphatic, cycloaliphatic or aromatic dicarboxylic or polycarboxylic acids. Examples of such carboxylic acids are phthalic acid, adipic acid, azelaic acid, sebacic acid, dodecanedioic acid, trimellitic acid, hexahydroterephthalic acid, hexahydrophthalic acid, succinic acid, and 1,4-cyclohexanedicarboxylic acid. Polyol components used for the amorphous polyesters are linear, aliphatic or cycloaliphatic diols. Examples of diols of this kind are monoethylene glycol, diethylene glycol, neopentyl glycol hydroxypivalate, neopentyl glycol, cyclohexanedimethanol, butane-1,4-diol, pentane-1,5-diol, pentane-1,2-diol, hexane-1,6-diol, and nonane-1,9-diol. In minor amounts it is possible to use branched, aliphatic or cycloaliphatic polyols as well. Examples of such polyols are trimethylolpropane, glycerol, and pentaerythritol.

The (semi)crystalline and amorphous polyesters can be obtained in a manner known per se by condensation of polyols and polycarboxylic acids or their esters, anhydrides or acid chlorides in an inert gas atmosphere at temperatures from 100 to 260° C., preferably from 130 to 220° C., in the melt or azeotropically, as described, for example, in Methoden der Organischen Chemie (Houben-Weyl); Volume 14/2, 1 to 5, 21 to 23, 40 to 44, Georg Thieme Verlag, Stuttgart, 1963, in C. R. Martens, Alkyd Resins, 51 to 59, Reinhold Plastics Appl. Series, Reinhold Publishing Comp., New York, 1961, or in DE-As 27 35 497 and 30 04 903.

As curing agents C) it is possible in principle to use all known curing agents having a functionality of at least 1.7 based on polyisocyanates for the powder coatings sector. Preference is given to using polyisocyanates containing blocking agents, and internally blocked polyisocyanates. They are described, for example, in DE-As 21 05 777, 25 42 191, 27 35 497, 30 39 824, 30 30 572, 30 30 513, and 37 39 549. The relevant portions of each of which are hereby incorporated by reference.

Isocyanates used for preparing the curing component C) are diisocyanates of aliphatic and (cyclo)aliphatic and/or cycloaliphatic structure. Diisocyanates of this kind are described, for example, in Houben-Weyl, Methoden der Organischen Chemie; Volume 14/2, p. 61 ff. and J. Liebigs Annalen der Chemie, Volume 562, pp. 75–136. Preference is generally given to using the readily industrially available aliphatic diisocyanates such as hexamethylene diisocyanate, 2-methylpentamethylene 1,5-diisocyanate, 2-ethyltetramethylene 1,4-diisocyanate or trimethylhexamethylene 1,6-diisocyanate, especially the 2,2,4- and the 2,4,4-isomers and technical-grade mixtures of both isomers, the (cyclo)aliphatic diisocyanates such as isophorone diisocyanate, and the cycloaliphatic diisocyanates such as 4,4'-diisocyanatodicyclohexylmethane or norbornane diisocyanate. By (cyclo)aliphatic diisocyanates are meant those containing at the same time cyclically attached and aliphatically attached NCO groups, as is the case with isophorone diisocyanate, for example. In contrast, cycloaliphatic diisocyanates are understood to be those containing only NCO groups attached directly to the cycloaliphatic ring.

In order to prepare the isocyanate component C) (containing urethane groups), in a first stage the diisocyanate is reacted with the polyol. The diisocyanate is introduced first at from 100 to 120° C. and then the polyol is metered in with intensive stirring over the course of from 2 to 3 hours, under nitrogen but in the absence of moisture, in such a way that at least 2, not more than 8, preferably from 4 to 6, equivalents of NCO of the diisocyanate react per OH equivalent of the polyol. In order to accelerate the reaction it is possible to add a conventional urethanization catalyst, examples being organotin compounds and also certain tertiary amines, such as triethylenediamine, in an amount of from 0.01 to 1% by weight, preferably from 0.05 to 0.15% by weight, based on the reaction mixture.

In the second stage the NCO groups are then blocked with a blocking agent. The reaction may be carried out without solvent or else in the presence of suitable inert solvents. It is preferred to proceed without solvent, however. In that case the blocking agent is added in portions to the polyol-diisocyanate adduct at from about 100 to 130° C. at a rate such that the temperature does not exceed 140° C. After the blocking agent has been added, the reaction is completed by heating the reaction mixture at 130° C. for from about 1 to 2 hours. The blocking agent is added in amounts such that from 0.7 to 1.1 mol of blocking agent, preferably 1 mol, is reacted per NCO equivalent of the urethanized diisocyanate.

Suitable polyols for reaction with the diisocyanate in the first stage of the preparation process are all of the polyols known in PU chemistry, such as ethylene glycol, propane-1,3-diol, butane-1,4-diol, pentane-1,5-diol, 3-methylpentane-1,5-diol, hexane-1,6-diol, 2,2,4-(2,4,4)-trimethylhexane-1,6-diol, 1,4-di(hydroxymethyl) cyclohexane, diethylene glycol, triethylene glycol, diethanolmethylamine, neopentyl glycol, triethanolamine, trimethylolpropane, trimethylolethane, glycerol, and pentaerythritol.

One advantageous variant of the preparation process comprises preparing the blocked diisocyanate adducts in the reverse order; i.e., in the first stage the diisocyanate is reacted partially with the blocking agent and in the second stage the product is reacted with the polyol.

A particularly preferred diisocyanate for preparing the isocyanate component C) containing urethane groups is isophorone diisocyanate.

The above mentioned diisocyanates are also used for preparing the trimers. The preparation of the trimers takes place in a known way in accordance with the details in GB-B 13 91 066 or DE-Cs 23 25 826, 26 44 684, and 29 16 201. The products of the process consist of isocyanato isocyanurate with higher oligomers where appropriate. They have an NCO content of from 10 to 22% by weight.

In the isocyanate component C) containing urethane and isocyanurate groups, the ratio of the urethane groups to the isocyanurate groups can be set at any desired level.

Any blocking agents can be used to block the isocyanate groups of the isocyanate component C). By way of example it is possible to use phenols such as phenol and p-chlorophenol, alcohols such as benzyl alcohol, oximes such as acetone oxime, methyl ethyl ketoxime, cyclopentanone oxime, cyclohexanone oxime, methyl isobutyl ketoxime, methyl tert-butyl ketoxime, diisopropyl ketoxime, diisobutyl ketoxime or acetophenone oxime, N-hydroxy compounds such as N-hydroxysuccinimide or hydroxypyridines, lactams such as ε-caprolactam, CH-acidic compounds such as ethyl acetoacetate or malonates, amines such as diisopropylamine, heterocyclic compounds containing at least one heteroatom such as mercaptans, piperidines, piperazines, pyrazoles, imidazoles, triazoles, and tetrazoles, α-hydroxybenzoic esters such as glycolic esters or hydroxamic esters such as benzyl methacrylohydroxamate.

Particularly suitable blocking agents include ε-caprolactam, acetone oxime, methyl ethyl ketoxime, acetophenone oxime, diisopropylamine, 3,5-dimethylpyrazole, 1,2,4-triazole, butyl glycolate, benzyl methacrylohydroxamate, methyl p-hydroxybenzoate, and mixtures of these blocking agents.

In order to carry out the blocking reaction, the general procedure is to introduce the isocyanate component first and to add the blocking agent in portions. The reaction may be carried out without solvent or else in the presence of suitable inert solvents. It is preferred, however, to operate without solvent. The isocyanate component is heated to 90–130° C. The blocking agent is added by a known technique at this temperature. After the blocking agent has been added, the reaction is then completed by heating the reaction mixture at 120° C. for from about 1 to 2 hours. The blocking agent is added in amounts such that from 0.5 to 1.1 mol of blocking agent, preferably from 0.8 to 1 mol, with particular preference 1 mol, reacts per NCO equivalent of the isocyanate component. The isocyanate polyaddition reaction can be accelerated by adding the catalysts customary in polyurethane chemistry, such as organic tin compounds, zinc compounds or amine compounds, for example, in an amount of from 0.01 to 1% by weight, based on the overall mixture.

The solvent-free blocking reaction may also be carried out continuously in a static mixer or, advantageously, in multishaft kneading apparatus, particularly a twin-screw extruder.

The overall NCO content of the blocked isocyanate component C) is from 8 to 20% by weight, preferably from 9 to 17% by weight.

Thus the powder coating materials of the invention may comprise curing agents C), based on blocked polyisocyanates, blocked isocyanurates, and uretdiones, alone or in mixtures. The starting components are preferably selected from IPDI, HDI and HMDI.

The auxiliaries and additives D) that are present in the PU powder coating materials of the invention are, for example, leveling agents, pigments, fillers, and catalysts. They are normally present in amounts of 1–50% by weight in the polymeric composition A, based thereon.

General preparation instructions for the powder coating materials:

The ready-to-use powder coatings are prepared by mixing the OH-functionalized polyester, the isocyanate-based curing agent, the polyurea-modified polyester, leveling agents, pigments, fillers and, where appropriate, catalysts with one another at room temperature and then homogenizing the mixture in an extruder or kneading apparatus at temperatures from 100 to 140° C. The ratio of resin to curing agent is chosen such that there are from 0.6 to 1.2, preferably from 0.8 to 1.0, NCO groups available per OH group of the resin.

After cooling, the extrudate is fractionated and ground and then sieved to a particle size <100 μm. The powder thus prepared is applied to degreased iron panels using an electrostatic powder spray unit at 60 kV and the coated panels are baked at between 160 to 210° C. in a forced air drying oven.

The formulations contain 1% by weight Resiflow PV 88 (leveling agent from Worlée-Chemie) and 0.5% by weight benzoin (devolatilizer from Merck-Schuchardt). The OH/NCO ratio is 1:1. 15 minutes at 200° C. were selected as the curing conditions.

EXAMPLES

1. Preparation of Polyurea in Crystalline Polyester by Reacting a Solution of IPDI Isocyanurate in Isophorone Diisocyanate (IPDI) with Isophorone Diamine (IPD)

The polyurea is prepared from a mixture of 40% by weight IPDI isocyanurate and 60% by weight IPDI as isocyanate component, plus IPD as amine.

The reaction takes place in the crystalline polyester DYNACOLL 7390. The DYNACOLL 7390 fraction of the overall formula is 79.8% by weight.

The molar ratio of NCO groups to $NH_2$ groups is 1:1. In addition to the $NH_2$ groups there are the OH groups from the polyester (OH number 31.8 mg KOH/g). The polyester is fed in the form of a coarse powder into the first barrel of a co-rotating twin-screw extruder in an amount of 15.99 kg/h.

The extruder has separately temperature-controllable barrels (heatable and coolable).

Barrel 1 is set at 30° C., barrel 2 at 80° C., and the following barrels at from 120 to 190° C.

The isocyanate mixture is metered at a feed temperature of from 60 to 80° C. into barrel 6 with a throughput of 2.66 kg/h.

The diamine is metered into barrel 3 at a feed temperature of 70 to 95° C. with a throughput of 1.38 kg/h.

The overall throughput is therefore 20.03 kg/h.

The exit temperature lies between 100 and 115° C.

The extruder speed is from 350 to 450 rpm.

The product emerges as a white paste, which is cooled on a cooling belt and cured.

2. Preparation of Polyurea in Amorphous Polyester by Reacting a Solution of IPDI Isocyanurate in Isophorone Diisocyanate (IPDI) with Isophorone Diamine (IPD)

The polyurea is prepared from a mixture of 40% by weight IPDI isocyanurate and 60% by weight IPDI as isocyanate component, plus IPD as amine.

The reaction takes place in the amorphous polyester URALAC P1580. The URALAC P1580 fraction of the overall formula is 79.9% by weight.

The molar ratio of NCO groups to $NH_2$ groups is 1:1. In addition to the $NH_2$ groups there are the OH groups from the polyester (OH number 78.0 mg KOH/g). The polyester is fed in the form of a coarse powder into the first barrel of a co-rotating twin-screw extruder in an amount of 15.99 kg/h.

The extruder has separately temperature-controllable barrels (heatable and coolable).

Barrel 1 is set at 30° C., barrel 2 at 80° C., and the following barrels at from 120 to 190° C.

The isocyanate mixture is metered at a feed temperature of from 60 to 80° C. into barrel 6 with a throughput of 2.66 kg/h.

The diamine is metered into barrel 3 at a feed temperature of 70 to 95° C. with a throughput of 1.37 kg/h.

The overall throughput is therefore 20.02 kg/h.

The exit temperature lies between 170 and 260° C.

The extruder speed is from 350 to 450 rpm.

The product emerges as a milky white, viscous film, which is cooled on a cooling belt and cured.

3. Powder Coating Materials

The powder coating materials are prepared as described in general above.

Powder coating materials

| Example | 1 | 2 | 3 | 4 |
|---|---|---|---|---|
| VESTAGON B 1530[1] | 17.2 | — | 16.3 | 17.2 |
| VESTAGON BF 1320[2] | — | 18.6 | — | — |
| URALAC P 1580[3] | 33.2 | 32.2 | 31.3 | 13.2 |
| DYNACOLL 7390[4] | 2.1 | 1.7 | 9.2 | 23.1 |
| Polyester/urea A[5] | 25.0 | 25.0 | — | — |
| Polyester/urea B[6] | — | — | 16.7 | — |
| Polyester/urea C[7] | — | — | — | 25.0 |
| MARTINAL ON-4608[8] | 20.0 | 20.0 | — | 20.0 |
| PRINTEX 60[9] | 1.0 | 1.0 | — | — |
| KRONOS 2160[10] | — | — | 25.0 | — |

Amounts in parts by weight
Key:
[1] Caprolactum-blocked polyisocyante; NCO content 15.6%; Degussa AG
[2] Internally blocked polyisocyante; NCO content 13.4%; Degussa AG
[3] Amorphous polyester, OH number 82 mg KOH/g; DSM
[4] Crystalline polyester, OH number 30 mg KOH/g; Degussa AG
[5] Modified polyester (80% DYNACOLL 7390/20% polyurea) as per 1.
[6] Modified polyester (70% DYNACOLL 7390/30% polyurea) as per 1.
[7] Modified polyester (80% URALAC P 1580/20% polyurea) as per 2.
[8] Filler (aluminum hydroxide); Martinswerk
[9] Furnace black; Degussa AG
[10] Titanium dioxide; KRONOS AG 4. Coatings Data

| Example | 1 | 2 | 3 | 4 |
|---|---|---|---|---|
| Film thickness ($\mu$m) | 72–85 | 70–81 | 65–73 | 54–67 |
| Gloss 60° angle | 12 | 20 | 18 | 10 |
| Cupping (mm) | 10.0 | 10.5 | 11.0 | 8.5 |
| Ball impact dir. (in lb) | 70 | 100 | 80 | 60 |

Key:
Gloss 60° angle = Gardner gloss measurement (ASTM-D 5233)
Cupping = Erichsen cupping (DIN 53 156)
Ball impact dir. = direct ball impact (ASTM D 2794-93)

DE 10221048.9, May 10, 2002, is hereby incorporated by reference.

What is claimed is:

1. A polyurethane composition comprising:
   A) from 3 to 35% by weight of a polymeric composition comprising
      1) at least one polymer and
      2) at least one thermoset in amounts of from 0.5 to 50% by weight, based on the sum of A1) and A2), prepared by reaction in the polymer matrix A1) of
         a) at least one starting component containing $NH_2$ groups and
         b) at least one starting component containing NCO groups, a) and b) having simultaneously or independently a functionality of $\geq 2$ and at least one starting component having a functionality of >2 being present in amounts of from 0.5 to 100% by weight, based on the weight of A2);
   B) from 15 to 45% by weight in the polymeric composition A), based thereon, of at least one amorphous and/or crystalline polyester having an OH number of from 10 to 250 mg KOH/g;
   C) from 7 to 25% by weight in the polymeric composition A), based thereon, of at least one curing agent based on blocked polyisocyanates, isocyanurates and/or uretdiones having a functionality of at least 1.7;
   D) from 1 to 50% by weight in the polymeric composition A), based thereon, of auxiliaries and additives; there being from 0.6 to 1.2 NCO groups per OH group of A) and B).

2. The polyurethane composition as claimed in claim 1, wherein said at least one polymer A1) has a functionality of $\geq 2$.

3. The polyurethane as claimed in claim 1, wherein said at least polymer A1) has OH groups and an OH functionality of $\geq 2$.

4. The polyurethane composition as claimed in claim 1, wherein A1) is selected from the group consisting of polyolefins, polybutadienes, polystyrenes, polysiloxanes, polyamides, and mixtures thereof.

5. The polyurethane composition as claimed in claim 3, wherein A1) is selected from the group consisting of OH-containing polyesters and polyacrylates, and mixtures thereof.

6. The polyurethane composition as claimed in claim 3, wherein A1) is selected from the group consisting of amorphous polyesters, (semi)crystalline polyesters, and mixtures thereof.

7. The polyurethane composition as claimed in claim 3, wherein A1) is selected from the group consisting of amorphous polyesters having a Tg of from 35 to 85° C., a melting range of from 60 to 110° C. and an OH number of from 15 to 200 mg KOH/g.

8. The polyurethane composition as claimed in claim 3, wherein A1) is selected from the group consisting of crystalline polyesters having a Tg of from −50 to 40° C., a melting range of from 60 to 130° C. and an OH number of from 15 to 130 mg KOH/g.

9. The polyurethane composition as claimed in claim 3, wherein the OH-containing polyesters are synthesized from starting components selected from the group consisting of succinic, adipic, suberic, azelaic, sebacic, phthalic, terephthalic, isophthalic, trimellitic, pyromellitic, tetrahydrophthalic, hexahydrophthalic, hexahydroterephthalic, dichlorophthalic and tetrachlorophthalic, endo-methylenetetrahydrophthalic, glutaric, 1,4-cyclohexanedicarboxylic acid, their anhydrides and/or esters, and mixtures thereof.

10. The polyurethane composition as claimed in claim 3, wherein the OH-containing polyesters are synthesized from diols and/or polyols selected from the group consisting of monoethylene glycol, 1,2- and 1,3-propylene glycol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, 3(4),8(9)-bis(hydroxymethyl)-tricyclo[5.2.1.0$^{2,6}$]decane (Dicidol), 1,4-bis-(hydroxymethyl)cyclohexane, 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, glycerol, trimethylolpropane, trimethylolethane, hexane-1,2,6-triol, butane-1,2,4-triol, tris(β-hydroxyethyl) isocyanurate, pentaerythritol, mannitol, sorbitol, diethylene glycol, triethylene glycol, tetraethylene glycol, dipropylene glycol, polypropylene glycols, polybutylene glycols, xylylene glycol, neopentyl glycol hydroxypivalate, and mixtures thereof.

11. The polyurethane composition as claimed in claim 3, wherein A1) is selected from the group consisting of OH-containing polyacrylates having an OH number of from 20 to 150 mg KOH/g and a Tg of from 30 to 90° C.

12. The polyurethane composition as claimed in claim 1, wherein A2b) is selected from the group consisting of aliphatic, cycloaliphatic, araliphatic and aromatic, isocyanates or isocyanurates, and mixtures thereof.

13. The polyurethane composition as claimed in claim 1, wherein A2b) is selected from the group consisting of cyclohexane diisocyanates, methylcyclohexane diisocyanates, ethylcyclohexane diisocyanates, propylcyclohexane diisocyanates, methyldiethylcyclohexane diisocyanates, phenylene diisocyanates, tolylene diisocyanates, bis(isocyanatophenyl)-methane, propane diisocyanates, butane diisocyanates, pentane diisocyanates, hexane diisocyanates, hexamethylene diisocyanate (HDI), 1,5-diisocyanato-2-methylpentane (MPDI), heptane diisocyanates, octane diisocyanates, nonane diisocyanates, 1,6-diisocyanato-2,4,4-trimethylhexane, 1,6-diisocyanato-2,2,4-trimethylhexane (TMDI), nonane triisocyanates, 4-isocyanatomethyl-1,8-octane diisocyanate (TIN), decane diisocyanates and triisocyanates, undecane diisocyanates and triisocyanates, dodecane diisocyanates and triisocyanates, isophorone diisocyanate (IPDI), bis (isocyanatomethyl-cyclohexyl)methane (H$_{12}$MDI), isocyanatomethyl methylcyclohexyl isocyanates, 2,5(2,6)-bis (isocyanatomethyl)bicyclo[2.2.1]heptane (NBDI), 1,3-bis (isocyanatomethyl)cyclohexane (1,3-H$_6$-XDI), 1,4-bis (isocyanatomethyl)cyclohexane (1,4-H$_6$-XDI), and their isocyanurates, and mixtures thereof.

14. The polyurethane composition as claimed in claim 1, wherein A2b) is selected from the group consisting of isophorone diisocyanate (IPDI), hexamethylene diisocyanate (HDI) and isocyanurates thereof, and mixtures thereof.

15. The polyurethane composition as claimed in claim 1, wherein A2a) is selected from the group consisting of aliphatic amines, cycloaliphatic amines, araliphatic amines and aromatic diamines, and mixtures thereof.

16. The polyurethane composition as claimed in claim 1, wherein A2a) is selected from the group consisting of 1,2-ethylenediamine, 1,2-propylenediamine, 1,3-propylenediamine, 1,2-butylenediamine, 1,3-butylenediamine, 1,4-butylenediamine, 2-(ethylamino) ethylamine, 3-(methylamino)propylamine, 3-(cyclohexylamino)propylamine, 4,4'-diaminodicyclohexylmethane, isophoronediamine (IPD), 4,7-dioxadecane-1,10-diamine, N-(2-aminoethyl)-1,2-ethanediamine, N-(3-aminopropyl)-1,3-propanediamine, N,N"-1,2-ethanediylbis(1,3-propanediamine), hexamethylene-diamines, which may be substituted as one or more C$_1$–C$_4$ alkyl radicals and mixtures thereof.

17. The polyurethane composition as claimed in claim 1, wherein thermoset A2) comprises IPDI, HDI isocyanurate, and isophoronediamine (IPD).

18. The polyurethane composition as claimed in claim 1, wherein thermoset A2) comprises the isocyanurate of IPDI and IPD.

19. The polyurethane composition as claimed in claim 1, wherein thermoset A2) comprises IPDI, IPDI isocyanurate and IPD.

20. The polyurethane composition as claimed in claim 1, wherein thermoset A2) comprises IPDI isocyanurate, HDI, and IPD.

21. The polyurethane composition as claimed in claim 1, wherein thermoset A2) comprises HDI, HDI isocyanurate and IPD.

22. The polyurethane composition as claimed in claim 1, wherein thermoset A2) comprises IPDI, HDI isocyanurate and IPD.

23. The polyurethane composition as claimed in claim 1, wherein thermoset A2) comprises IPDI, IPDI isocyanurate, HDI and HDI isocyanurate.

24. The polyurethane composition as claimed in claim 1, wherein the reaction to give thermoset A2) takes place at an NCO/.NH$_2$ ratio of from 0.8 to 1.2:1.

25. The polyurethane composition as claimed in claim 1, wherein thermoset A2) comprises at least 8% by weight of isocyanurate(s) and/or amine(s) having a functionality >2.

26. The polyurethane composition as claimed in claim 1, wherein from 2 to 30% by weight of thermoset A2) is present in the polymeric composition, based thereon.

27. The polyurethane composition as claimed in claim 1, wherein B) is at least one (semi)crystalline polyester having a hydroxyl number of from 15 to 100 mg KOH/g, a melting point of from 50 to 130° C., and a glass transition temperature of <−10° C.

28. The polyurethane composition as claimed in claim 1, wherein B) is at least one amorphous polyester having a hydroxyl number of from 15 to 200 mg KOH/g, a melting point of $\geq 70°$ C. to $\leq 120°$ C., and a glass transition temperature of >40° C.

29. The polyurethane composition as claimed in claim 1, wherein B) is a mixture of (semi)crystalline and amorphous polyesters.

30. The polyurethane composition as claimed in claim 1, wherein C) is selected from the group consisting of diisocyanates of aliphatic, (cyclo)aliphatic and cycloaliphatic structure, and mixtures thereof.

31. The polyurethane composition as claimed in claim 1, wherein C) is selected from the group consisting of hexamethylene diisocyanate, 2-methylpentamethylene 1,5-diisocyanate, 2-ethyltetramethylene 1,4-diisocyanate, 2,2,4 (2,4,4)-trimethylhexamethylene 1,6-diisocyanate, isophorone diisocyanate, 4,4'-diisocyanatodicyclohexylmethane, norbornane diisocyanate, and mixtures thereof.

32. The polyurethane composition as claimed in claim 1, wherein C) is selected from the group consisting of ethylene glycol, propane-1,3-diol, butane-1,4-diol, pentane-1,5-diol, 3-methylpentane-1,5-diol, hexane-1,6-diol, 2,2,4(2,4,4)-trimethylhexane-1,6-diol, 1,4-di(hydroxymethyl) cyclohexane, diethylene glycol, triethylene glycol, diethanolmethylamine, neopentyl glycol, triethanolamine, trimethylolpropane, glycerol, pentaerythritol, and mixtures thereof.

33. The polyurethane composition as claimed in claim 1, wherein C) is prepared by reacting at least two and not more than 8 equivalents of NCO of diisocyanate per OH equivalent.

34. The polyurethane composition as claimed in claim 1, wherein C) is selected from the group consisting of the trimers of hexamethylene diisocyanate, 2-methylpentamethylene 1,5-diisocyanate, 2-ethyltetramethylene 1,4-diisocyanate, trimethylhexamethylene 1,6-diisocyanate, isophorone diisocyanate, 4,4'-diisocyanatodicyclohexylmethane, norbornane diisocyanate, and mixtures thereof.

35. The polyurethane composition as claimed in claim 1, wherein a blocking agent for C) is present and is selected from the group consisting of phenol, p-chlorophenol, benzyl alcohol, acetone oxime, methyl ethyl ketoxime, cyclopentanone oxime, cyclohexanone oxime, methyl isobutyl ketoxime, methyl tert-butyl ketoxime, diisopropyl ketoxime, diisobutyl ketoxime, acetophenone oxime, N-hydroxysuccinimide, hydroxypyridines, ε-caprolactam, ethyl acetoacetate, malonates, diisopropylamine, 3,5-dimethylpyrazole, 1,2,4-triazole, glycolic esters, benzyl methacrylohydroxamate, methyl p-hydroxybenzoate, and mixtures thereof.

36. The polyurethane composition as claimed in claim 1, wherein component C) has an NCO content of from 8 to 20% by weight.

37. The polyurethane composition as claimed in claim 1, wherein component C) is blocked such that there are from 0.5 to 1.1 mol of blocking agent per equivalent of isocyanate.

38. The polyurethane composition as claimed in claim 1, wherein an OH/NCO ratio is 1:0.8 to 1.2.

39. The polyurethane composition as claimed in claim 1, wherein D) is selected from the group consisting of catalysts, pigments, fillers, dyes, leveling agents, light stabilizers, heat stabilizers, antioxidants, gloss enhancers and effect additives.

40. The polyurethane composition as claimed in claim 1, wherein catalyst(s) is/are present in a concentration of from 0.01 to 1.0% by weight, based on the overall powder coating composition.

41. The polyurethane composition as claimed in claim 1, wherein organic tin compound(s) and/or amine(s) is/are present in a concentration of from 0.01 to 1.0% by weight, based on the overall powder coating composition.

42. The polyurethane composition as claimed in claim 1, wherein thermoset A2) comprises at least 20% by weight of isocyanurate(s) and/or amine(s) having a functionality >2.

43. The polyurethane composition as claimed in claim 1, wherein thermoset A2) comprises 40 to 100% by weight of isocyanurate(s) and/or amine(s) having a functionality >2.

44. The polyurethane composition as claimed in claim 1, wherein from 3 to 20% by weight of thermoset A2) is present in the polymeric composition, based thereon.

* * * * *